United States Patent
Park et al.

(10) Patent No.: US 10,164,788 B2
(45) Date of Patent: Dec. 25, 2018

(54) REMOTE CONTROL METHOD AND SYSTEM USING CONTROL USER INTERFACE

(75) Inventors: Ho Yeon Park, Seoul (KR); Sung Oh Hwang, Yongin-si (KR); Bo Sun Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/392,972

(22) PCT Filed: Aug. 24, 2010

(86) PCT No.: PCT/KR2010/005635
§ 371 (c)(1),
(2), (4) Date: Feb. 28, 2012

(87) PCT Pub. No.: WO2011/025219
PCT Pub. Date: Mar. 3, 2011

(65) Prior Publication Data
US 2012/0159343 A1 Jun. 21, 2012

(30) Foreign Application Priority Data
Aug. 28, 2009 (KR) .................. 10-2009-0080620

(51) Int. Cl.
G06F 3/01 (2006.01)
G06F 15/16 (2006.01)
H04L 12/28 (2006.01)

(52) U.S. Cl.
CPC ........ *H04L 12/282* (2013.01); *H04L 12/2814* (2013.01)

(58) Field of Classification Search
CPC ........... H04N 5/4403; H04N 21/42224; H04N 5/445; G06F 3/017; G06F 3/048;
(Continued)

(56) References Cited

U.S. PATENT DOCUMENTS 6,862,741 B1 * 3/2005 Grooters ............ H04N 5/44582
348/734
6,880,010 B1 4/2005 Webb et al.
(Continued)

FOREIGN PATENT DOCUMENTS

CN 1941729 A 4/2007
KR 10-2002-0024066 A 3/2002
(Continued)

OTHER PUBLICATIONS

"ANSI/CEA Standard. Web-Based Protocol and Framework for Remote User Interface on UPNP Networks and the Internet (WEB4CE)", XP002431656, Dec. 2006, pp. 1-194.
(Continued)

*Primary Examiner* — Sang H Kim
(74) *Attorney, Agent, or Firm* — Jefferson IP Law, LLP

(57) ABSTRACT

The present disclosure relates to a method and a system for remote control, and a remote control method using a control user interface of a remote user interface (UI) client according to an exemplary embodiment of the present invention includes receiving, by the remote UI client, a message requesting a service from a remote device; transmitting a message requesting a control UI related to the requested service to a remote UI server when the remote UI client receives the message requesting the service from the remote device; receiving, by the remote UI client, a control UI corresponding to the message requesting the control UI from the remote UI server; and transmitting, by the remote UI client, the received control UI to the remote device. According to an exemplary embodiment of the present invention, a user may easily control a corresponding remote user interface through a control user interface specified for a screen on which the remote user interface is being reproduced.

16 Claims, 9 Drawing Sheets

(58) Field of Classification Search
CPC ...... G06F 15/177; G06F 3/0484; G06F 3/002;
G06F 3/1423; G06F 3/038; G06F 3/041;
H04W 88/06; H04W 48/18
USPC .......... 455/420, 418, 557; 348/734; 715/744
See application file for complete search history.

(56) References Cited

U.S. PATENT DOCUMENTS

| | | | |
|---|---|---|---|
| 2002/0100063 A1 | 7/2002 | Herigstad et al. | |
| 2004/0183756 A1* | 9/2004 | Freitas et al. ................... | 345/73 |
| 2005/0058429 A1* | 3/2005 | Kawanishi ............ | H04N 5/782 |
| | | | 386/241 |
| 2005/0132055 A1* | 6/2005 | Neogi ...................... | H04L 63/08 |
| | | | 709/227 |
| 2006/0174026 A1 | 8/2006 | Robinson et al. | |
| 2007/0055998 A1 | 3/2007 | Kang et al. | |
| 2007/0089055 A1 | 4/2007 | Ko et al. | |
| 2007/0118798 A1* | 5/2007 | Pickering et al. ............ | 715/700 |
| 2007/0229465 A1* | 10/2007 | Sakai ...................... | G08C 17/00 |
| | | | 345/173 |
| 2008/0163330 A1* | 7/2008 | Sparrell ............... | H04M 11/007 |
| | | | 725/142 |
| 2008/0243998 A1 | 10/2008 | Oh et al. | |
| 2009/0061841 A1* | 3/2009 | Chaudhri et al. ............. | 455/420 |
| 2009/0100474 A1* | 4/2009 | Migos .............................. | 725/61 |
| 2009/0106659 A1* | 4/2009 | Rosser .............. | G06F 17/30056 |
| | | | 715/730 |
| 2009/0210488 A1 | 8/2009 | Lee | |
| 2009/0251619 A1* | 10/2009 | Seidel et al. ................... | 348/734 |
| 2009/0320113 A1* | 12/2009 | Larsen et al. ...................... | 726/7 |
| 2010/0037180 A1* | 2/2010 | Elias et al. ..................... | 715/840 |
| 2010/0218211 A1* | 8/2010 | Herigstad ............... | H04N 7/163 |
| | | | 725/34 |
| 2010/0317332 A1* | 12/2010 | Bathiche et al. ............. | 455/418 |
| 2010/0319043 A1* | 12/2010 | Jain ...................... | H04N 5/4403 |
| | | | 725/110 |
| 2011/0283321 A1* | 11/2011 | Cruz ...................... | G08C 17/00 |
| | | | 725/40 |
| 2014/0294363 A1* | 10/2014 | Bumgardner .......... | H04N 5/782 |
| | | | 386/293 |

FOREIGN PATENT DOCUMENTS

| | | |
|---|---|---|
| KR | 10-2007-0028077 A | 3/2007 |
| KR | 10-2007-0049390 A | 5/2007 |
| KR | 10-2008-0089134 A | 10/2008 |
| KR | 10-2008-0092038 A | 10/2008 |

OTHER PUBLICATIONS

"ISO/IEC 24752-1. Information technology-User interfaces—Universal remote console, Part 1: Framework", XP009125428, Feb. 15, 2008.

* cited by examiner

FIG. 3
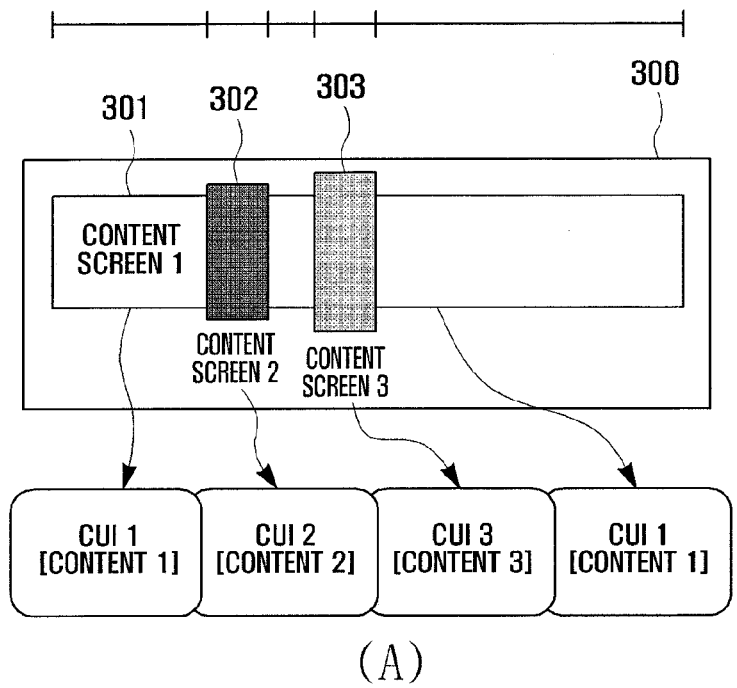
(A)
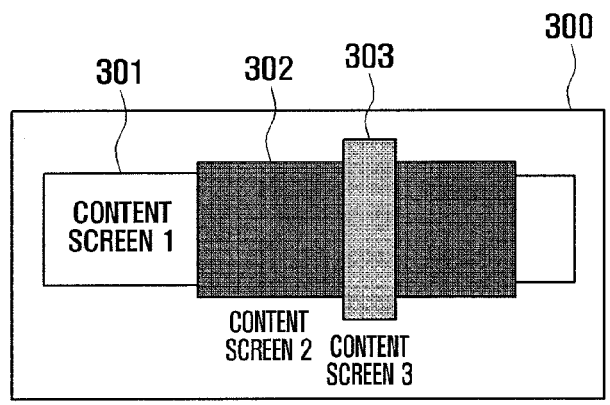
(B)
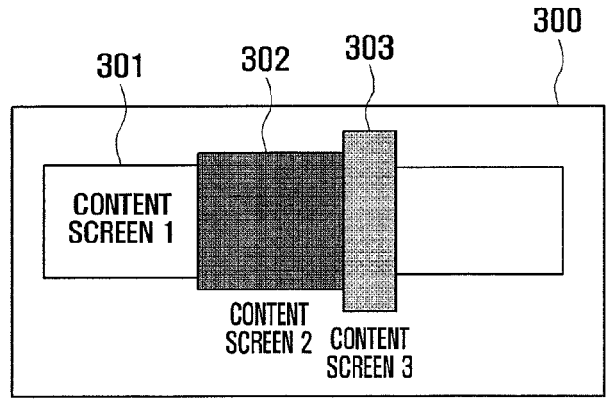
(C)

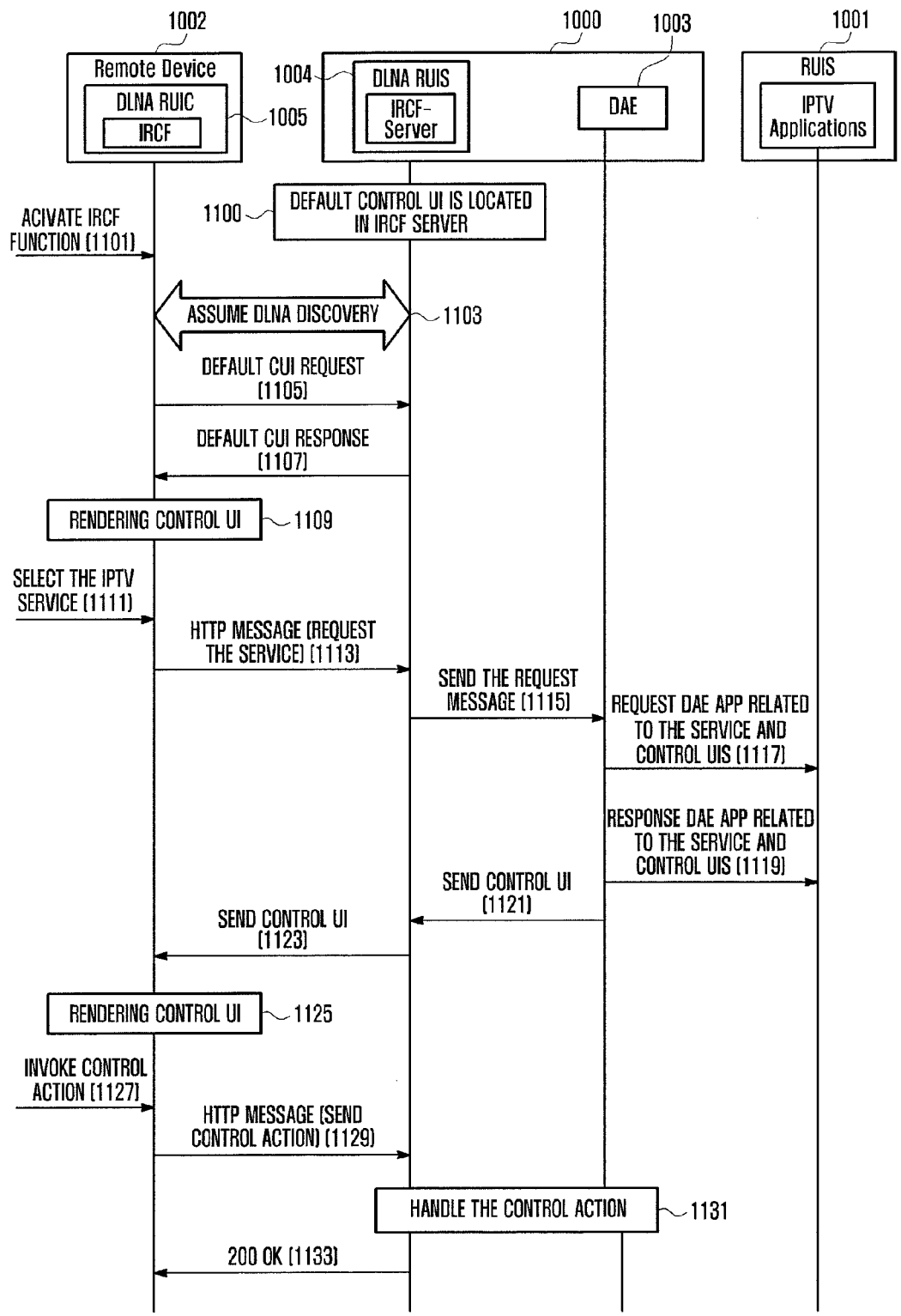

REMOTE CONTROL METHOD AND SYSTEM USING CONTROL USER INTERFACE

TECHNICAL FIELD

The present invention relates to a method and a system for remote control, and more particularly, to a method and a system for remote control capable of controlling a particular device by providing a control user interface to a third party device in a remote area.

BACKGROUND ART

An active research for improving a home network technology is conducted by many organizations for industry standardization such as digital living network alliance (DNLA), home audio-video interoperability (HAVi), or universal plug and play (UPnP).

In a home network, a remote user interface (RUI) technology can be used in order to enable a device to control a function of another device. To simply explain, the RUI technology, which is based on a client-server architecture, is a technology that enables an RUI client to fetch an UI from a RUI server (remote user interface server, RUIS) so that a user can control the RUI server from the RUI client (remote user interface client, RUIC) through the UI.

In such a conventional approach, a control UI that can control a content (RUI) that is being rendered at the RUIC can be received only when requested by the user through a third party RUIC and a control UI that is appropriate for a corresponding content screen of a content being rendered at the RUIC at a particular time point cannot be received from the RUIC to the third party RUIC without a user request, and also, the conventional approach is disadvantageous in that the user needs to manually locate a control UI appropriate for controlling a content screen currently being rendered and send a request to the RUIC and, when the requested control UI is rendered on the third party RUIC, information about a control UI previously rendered is disappeared.

DISCLOSURE

Technical Problem

Thus, the present invention has been made in view of the above problems, and an objective of the present invention is to provide a method and a system for remote control in which a control UI associated with a content can be easily transmitted to a third party device (RUIC) at a particular time point without a user intervention.

In addition, another object of the present invention is to provide a method and a system for remote control in which information about a status of a control UI immediately previous to a control UI to be transmitted to the third party device (RUIC) at a particular time point is remembered so that an immediately previous control UI can be rendered as it is on the third party device (RUIC) when needed.

Technical Solution

In order to achieve the above objects, a remote control method using a control user interface of a remote user interface (UI) client according to an exemplary embodiment of the present invention may comprise receiving, by the remote UI client, a message requesting a service from a remote device; transmitting a message requesting a control UI related to the requested service to a remote UI server when the remote UI client receives the message requesting the service from the remote device; receiving, by the remote UI client, a control UI corresponding to the message requesting the control UI from the remote UI server; and transmitting, by the remote UI client, the received control UI to the remote device.

In order to achieve the above objects, a remote control method using a control user interface of a remote device according to an exemplary embodiment of the present invention may comprise transmitting, when the remote device receives a selection input, a message requesting a service to a remote user interface (UI) client; receiving, by the remote device, a control UI corresponding to the message requesting the control UI from the remote UI client; and rendering, by the remote device, the received control UI.

In order to achieve the above objects, a remote control system using a control user interface, the remote control system according to an exemplary embodiment of the present invention may comprise a remote device configured to transmit a message requesting a service to a remote user interface (UI) client when a selection input is received and configured to receive and render a control UI corresponding to the message requesting the service; the remote UI client configured to transmit a message requesting a control UI related to the requested service to a remote UI server upon receiving the message requesting the service from the remote device and configured to transmit a control UI, received from the remote UI server, corresponding to the message requesting the control UI to the remote device; and the remote UI server configured to transmit, upon receiving the message requesting the control UI from the remote UI client, the control UI corresponding to the message requesting the control UI.

Advantageous Effects

As described above, according to the present invention, with respect to an RUI being rendered on an RUIC device, a control UI associated with a corresponding RUI can easily be transmitted to a third party device at a particular time point without user intervention, and a control UI associated with an RUI is provided to a user through the third party device so that the user may easily control the corresponding RUI through a control UI specified for a screen in which the RUI is being reproduced.

DESCRIPTION OF DRAWINGS

FIG. 3 is a view for explaining a content controlled by a plurality of control UIs according to an exemplary embodiment of the present invention;

FIG. 9 is a view for explaining a remote control method using a plurality of control UIs according to another exemplary embodiment of the present invention.

MODE FOR INVENTION

Figure 1:
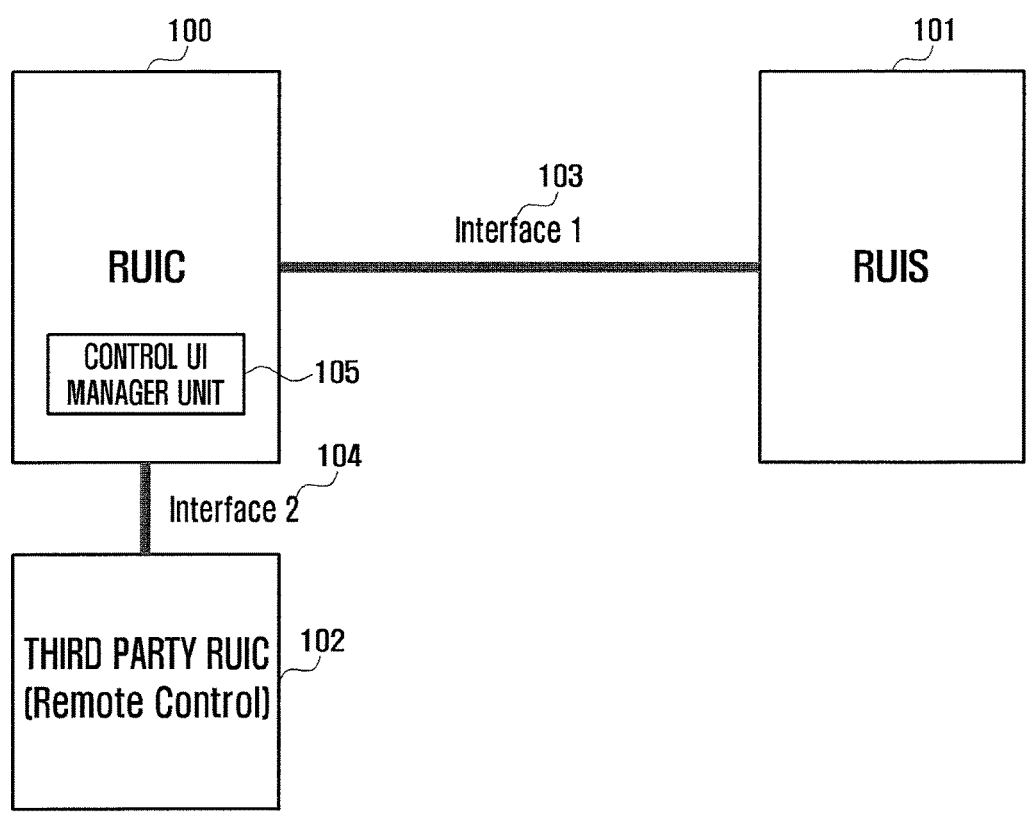
FIG. 1 is a view for explaining a remote control system according to an exemplary embodiment of the present invention.

Advantages, features and objectives of the present invention will become apparent from the following detailed description of exemplary embodiments with reference to the accompanying drawings. However, it should be noted that the present invention is not limited to embodiments described herein but can be embodied in various different forms, the embodiments are provided to complete the disclosure of the present invention and to allow a person of ordinary skill in the art to understand the scope of the invention, and the scope of the present invention is defined only by the appended claims. Like reference numerals are used to refer to like elements throughout the specification.

First, a remote control system according to an exemplary embodiment of the present invention will be described.

FIG. 1 is a view for explaining a remote control system according to an exemplary embodiment of the present invention.

Referring to FIG. 1, the remote control system according to an exemplary embodiment of the present invention includes a remote UI server (remote user interface server; hereinafter, referred to as "RUIS") 101, a remote UI client (remote user interface client; hereinafter, referred to as "RUIC") 100, and a third party device 102.

The RUIS 101 refers to a device that transmits, for example, remote user interface (hereinafter, referred to as "RUI"), control user interface (hereinafter, referred to as "CUI") and control information to a client in a client-server architecture system.

The RUIC 100 refers to a device that receives an UI from the remote UI server (RUIS) and, based on the received UI, controls the remote UI client (RUIC) and/or the remote UI (RUI) being rendered at the UI client (RUIC).

The third party device 102 is a type of the RUIC and is referred to as the third party device in a sense that the third party device 102 receives the control UI (CUI) provided from the RUIS 101 through the RUIC 100. Also, the third party device 102 controls the RUIC 100 or a content of the RUIC 100 through the RUI or the CUI. The RUI or the CUI may be provided from the remote UI client (RUIC) or the remote UI server (RUIS).

In an exemplary embodiment of the present invention, an IPTV is described as an example of the RUIC 100 and a mobile device (e.g., a cellular phone) or a portable device (e.g., small size display devices with a communication capability) is described as an example of the third party device 102.

The RUIC 100 receives the RUI and the control information from the RUIS 101 through a protocol (Interface 1) 103 that is currently used. The received control information is separated by a control UI manager unit 105, and the control UI is transmitted to the third party device 102 for controlling the RUIC 101 through the control UI manager unit 105. The received control UI is rendered at the third party device 102 and a user may control the RUIC 100 by using the received control UI. The control UI manager unit 105 is a logical unit and can be located inside or outside of the RUIC, and can be, for example, an OITF-RD server functional entity for communicating with DLNA, RUIS of CEA-2014, or a mobile device and/or portable device that exists within an OITF of an Open IPTV Forum.

Also, protocols are defined such that the RUIC 101 may be controlled through the third party device 102 (i.e., remote control RUIC device).

Here, protocols that need to be defined between the third party device (remote control RUIC) 102 and RUIC 100 and/or RUIS 101 are shown in Table 1 below, of which contents are as follows.

TABLE 1

| 1. | discovery |
| 2. | capability matching |
| 3. | transfer CUI |
| 4. | control |

Referring to Table 1, first, a process in which the third party device 102 discovers the RUIS 101 and RUIC 100 (i.e., a device discovery process) is required. Second, a capability matching process in which, after the discovery of the RUIC 100 and the RUIS 101, information required to fetch the control UI is obtained and compared is required. Third, in case where it is recognized that the third party device 102 is capable of controlling the RUIC 100 and even the control UI (CUI) can be fetched, a process in which the control UI is transmitted to the third party device 102 is required.

In the process in which the control UI is transmitted to the third party device 102, the control UI can be transmitted upon request from the third party device 102, or alternatively, the control UI can be transmitted from the RUIC 100 without the request from the third party device 102. For example, the control UI can be received by the third party device 102 from the RUIC 100 through a notification.

Next, when the third party device 102 receives the control UI, the received control UI is rendered and the user may actually control the RUIC 100 based on the rendered control UI.

Table 2 as shown below is provided to illustrate a screen configuration of a content according an exemplary embodiment of the present invention.

TABLE 2

| Reproducing Order (Chronological order) | 1 | 2 | 3 | 4 |
| --- | --- | --- | --- | --- |
| Contents | Content screen 1 | Content screen 2 | Content screen 3 | Content screen 1 |
| Control UI | CUI1 | CUI2 | CUI3 | CUI1 |

As shown in Table 2, a content according to an embodiment of the present invention can be divided into a plurality of content screens and each content screen can be controlled by different control UIs.

According to an exemplary embodiment of the present invention, in order to easily provide a plurality of control UIs associated with a content to the third party device 102 at a particular time point without user intervention, the RUIC 100, when transmitting the control UI related to a content (RUI) that is currently being rendered at the third party device 102, transmits the control UI through a start notification (or START CUI event notification). Here, information about a control UI, which immediately previously controls the content, is stored in a memory device.

Meanwhile, when a current content screen that can be controlled by the control UI transmitted to the third party device 102 is ended, the RUIC 100 fetches a control UI, from the memory device, which can control a content screen that appears subsequently to the current content screen to be transmitted to the third party 102. Such transmission of the control UI is achieved through a termination notification (or END CUI event notification).

The third party device 102 renders the received control UI on a screen so that the control UI can be used by the user.

A CUI event notification (referred to as "event notification") according an embodiment of the present invention includes the start notification (or START CUI event notification) and the termination notification (or End CUI event notification) and a new control UI is provided to the third party device 102 through the start notification (or START CUI event notification) and a previously used control UI is provided to the third party device 102 through the termination notification (or END CUI event notification) stored in the memory device.

Here, in storing and maintaining the control UI information in the memory device through the event notification (CUI event notification), current information about the control UI currently being used by the third party device 102 is recorded in the memory device when the start notification (START CUI event notification) occurs. Whenever the start notification (START CUI event notification) occurs, as described above, the current information about the control UI currently being used by the third party device 102 is stored in the memory device in a stacking manner.

Meanwhile, when the termination notification (END CUI Event Notification) occurs, information about a control UI, which is the most recently stored among control UIs stored in the memory device of the RUIC 100 in the stacking manner, is compared with a control UI that can control a next content screen.

In this case, if the two are the same control UIs, the RUIC 100 fetches the information about the control UI that is the most recently stored from the memory device to be transmitted to the third party device 102. The third party device 102 restores the control UI to its previous state based on the received information about the control UI. In a moment when the control UI that is the most recently stored is transmitted to the third party device 102 through the termination notification (END CUI Event Notification), or in a moment when, after the control UI is transmitted to the third party device 102, a message that a recovery of the control UI is completed is received by the third party device 102, the RUIC 100 deletes the control UI information that is stored at top of the memory.

However, when the control UI information the most recently stored is different from the control UI that can control an immediately following screen, as shown in Table 2, simply the control UI that can control the next content screen is transmitted to the third party device. A content screen 2 and a content screen 3 are applicable to such case. When the content screen 2 is ended, the memory device currently has the control UI (CUI1) that can control the content screen 1 on top of a stack structure and the information about the control UI that is at top of the memory device is different from a control UI (CUI3) that can control the content screen 3 that is to be subsequently reproduced.

If, during when the third party device 102 receives the control UI from the RUIC 100, a loss of the control UI or a communication failure occurs, the RUIC 100 can resend a corresponding control UI to the third party device 102.

According to an exemplary embodiment of the present invention, as described above, the control UI is provided to the third party device (remote UI device) 102, such as a mobile device or a portable device that can display the UI, through the CUI event notification at a particular time point of the RUI that is being rendered in the RUIC 100. The third party device (remote UI device) 102 provides control information that matches to the UI through such control UI or provides additional information (personalized UI) customized to the user. The user controls the RUIC 100 through the provided control information. Here, providing the control information necessarily needed for the user can be interpreted in different ways. Only information that can control the current RUI that is rendered by the RUIC 100 can be provided to the third party device 102 or customized control information that matches the user who uses each third party device 102. Also, the third party device 102 can receive control information uniquely owned by device manufacturers of the RUIS 101 and the RUIC 102 and renders the control UI on the third party device 102 based on the provided control information such that the user can use the control UI.

Next, a remote control method according an embodiment of the present invention will be described in more detail.

Figure 2:
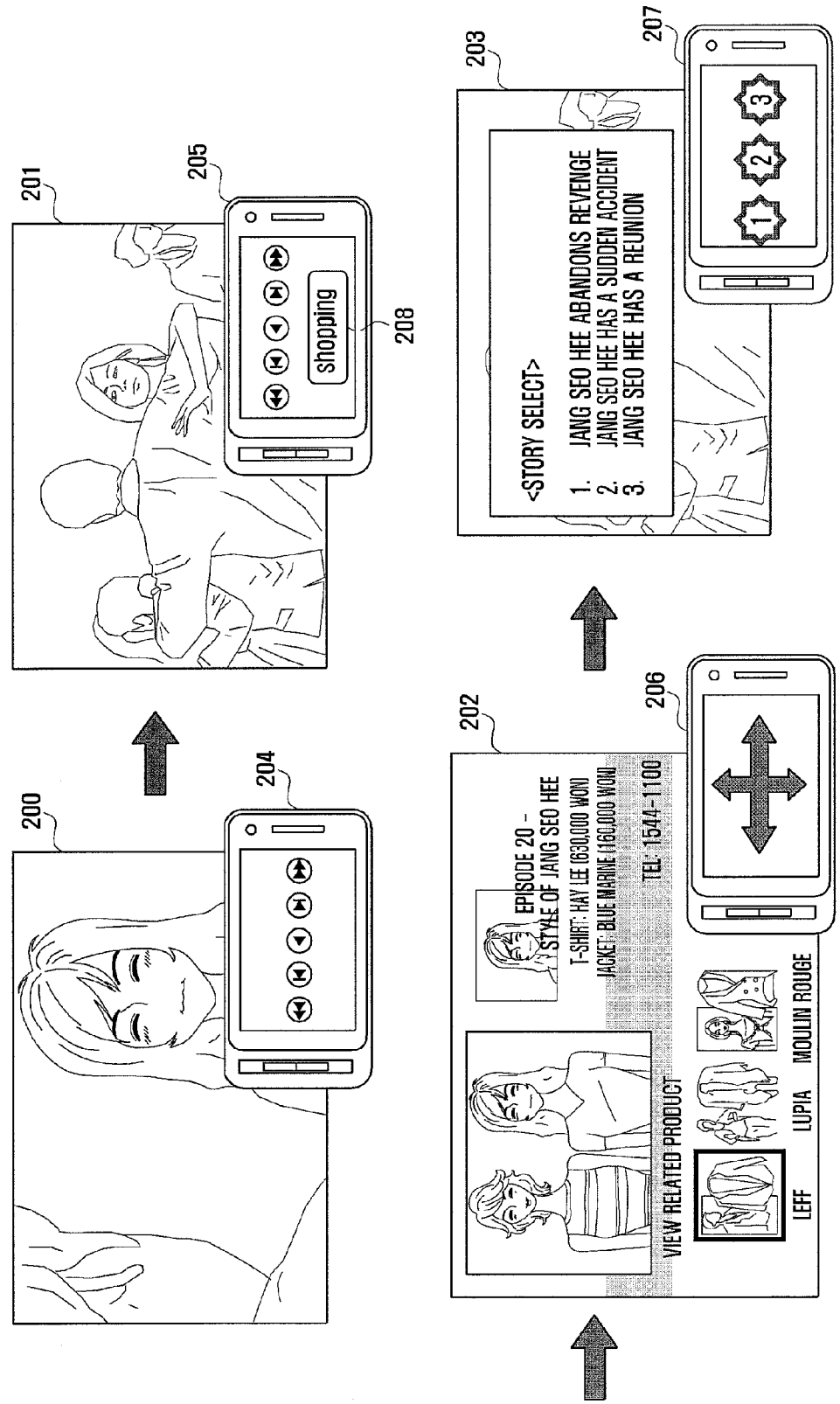
FIG. 2 is an example screen for explaining a plurality of control UIs required at a particular time point with respect to a content according to an exemplary embodiment of the present invention.

FIG. 2 is an example screen for explaining a plurality of control UIs required at a particular time point with respect to a content according to an exemplary embodiment of the present invention In FIG. 2, reference numerals 200, 201, 202, 203 refer to an UI that is being rendered at the RUIC 100, and reference numerals 204, 205, 206, 207 refer to an UI that is being rendered at the third party device 102.

The RUIC 100 renders the RUI 200 having a specific content and the third party device 102 renders the control UI 204 for controlling the corresponding RUI 200. Here, the specific content may be of a content on demand (CoD) type.

During this rendering, at a particular point in time 201, i.e., when a heroin of a current scene dances in a dress shown on a screen 201, the RUIC 100 transmits control UI information 205 which permits purchase of the dress and an accessory the heroin is wearing to the third party device 102. After receiving the control UI information from the RUIC 100, the third party device 102 renders the control UI information to be used by the user. A button 208 for allowing shopping is created on the third party device 102 and positions of other control UI buttons and images are adjusted. When the user presses the shopping button 208, the content screen 201 that is currently rendered is switched to a shopping screen 202 and the control UI 206 that can control the shopping screen 202 is transmitted to the third party device. The user can shop through the transmitted control UI 206. When the user finishes shopping, the RUI being rendered on the RUIC 100 returns to the previous content screen 201, which is continued to play. Here, the control UI 205 that can control the corresponding content screen 201 also returns to its previous state. After a predetermined period of time elapses and a content is ended, a screen 203 is provided to enable the user to select a story of a drama, and again, the RUIC 100 transmits the control UI 207 for enabling the user to select the story of the drama to the third party device 102. The user can select the story of the drama through the transmitted control UI 207.

FIG. 3 is a view for explaining a content controlled by a plurality of control UIs according to an exemplary embodiment of the present invention.

Referring to FIG. 3, an RUI content 300 that is rendered by the RUIC 100 includes multiple screens 301, 302, 303 and particular control UIs 304, 305, 306 for controlling each of the content screens 301, 302, 303 exist. Also, when each of the content screens 301, 302, 303 is rendered, the RUIC 100 transmits the control UIs 304, 305, 306 for controlling a content screen being rendered to the third party device 102. The transmitted control UI is rendered on the third party device 102 and the user can control the RUI content that is rendered by the RUIC 100 through the control UI being rendered.

For example, referring to a reference numeral (A), a content screen 1, 301, is controlled by a control UI 1, 304, and a content screen 2, 302, is controlled by a control UI 2, 305, and a content screen 3, 303, is controlled by a control UI 3, 306. When the content screen 2, 302, is reproduced during reproducing of the content screen 1, 301, the RUIC 100 transmits the control UI 2, 305, for controlling the content screen 2, 302, to the third party device 102. Then, the third party device 102 renders the control UI 2, 305, and the user may control the content screen 2, 302, that is being rendered by the RUIC 100 through the control UI 2, 305, that is being rendered.

On the other hand, reference numerals (B) and (C) represent other exemplary embodiments having different configuration of a content screen.

Figure 4:
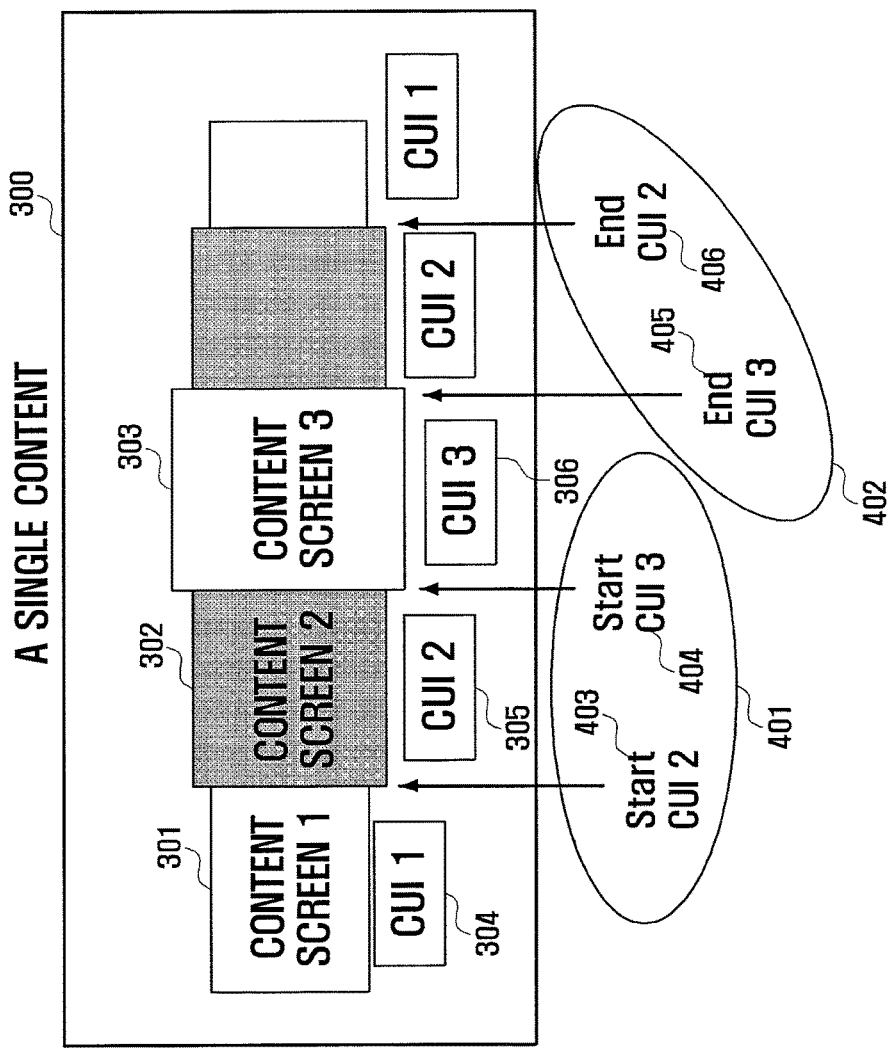
FIG. 4 is a view for explaining a notice for transmitting control UI information capable of controlling a corresponding content screen at a particular time point according to the present invention.

FIG. 4 is a view for explaining a notice for transmitting control UI information capable of controlling a corresponding content screen at a particular time point according to the present invention Referring to FIG. 4, a method of providing a required control UI with respect to the RUI content 300 at a particular time point is shown.

The RUIC 100 receives the control UI information from the RUIS 101 in advance. The control UI information includes information about generating the start notification (START CUI Event Notification) 401 and the termination notification (END CUI Event Notification) 402 at a particular time point.

The start notification (START CUI Event Notification) 401 triggers, when a content screen is changed, such that the RUIC 100 transmits a control UI for controlling a changed content screen to the third party device 101.

The termination notification (END CUI Event Notification) 402 notifies that the changed screen is ended and a control by the control UI for controlling a corresponding screen is terminated.

Referring to FIG. 4, during when the RUIC 100 reproduces the content screen 1, 301, if the content screen 2, 302, is rendered at a particular time point, the control UI 2, 305, is needed to control the content screen 2, 302.

Here, the RUIC 100 transmits information about the control UI 2, 305, for controlling the content screen 2 to the third party device 102 by using the start notification (Start CUI Notification) 403. Then, after the third party device 102 obtains the information about the control UI 2, 305, the third party device 102 renders the control UI 2, 305, for controlling the content screen 2, 302, on a screen of the third party device 102 by using the obtained information. And the third party device 102 controls the content screen 2, 302, through a screen on which the control UI 2, 305, is rendered.

In addition, during when the content screen 2, 302, is rendered, if the content screen 3, 303, is rendered such that the control UI 3, 306, is needed, the RUIC 100 transmits the control UI 3, 306, for controlling the content screen 3 303 to the third party device 102 by using the start notification (Start CUI Notification) 404. Then the third party device controls the content screen 3, 303, through the control UI 3, 306.

When the content screen 3, 303, is ended, the RUIC 100 transmits the termination notification (End CUI Notification) 405 to the third party device 102, which performs to return the previous control UI 2, 305 to control the content screen 2, 302. Likewise, when the content screen 2, 302, is ended, the termination notification (End CUI Notification) 406 is again generated and the previous control UI 1, 304 is returned for the user to control the content screen 1, 301.

Figure 5:
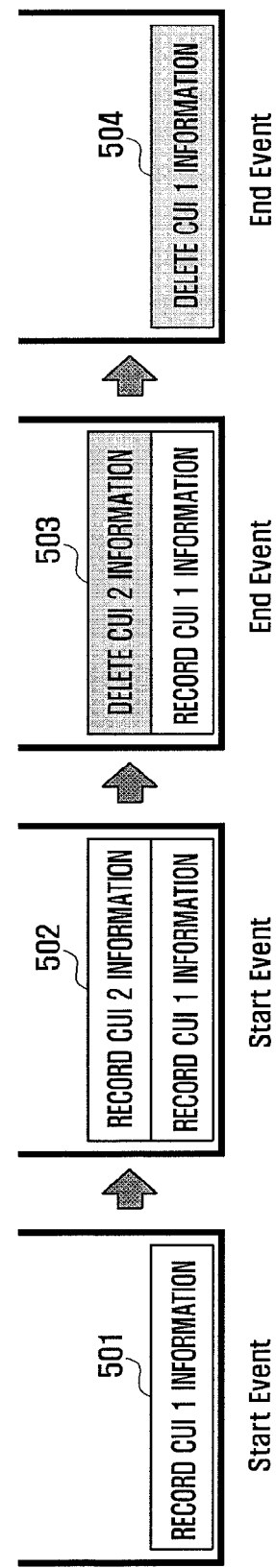
FIG. 5 is a view illustrating a method of maintaining information about a plurality of control UIs according to the present invention.

As such, in order for the RUIC 100 to provide a new control UI to the third party device 102 and returns the control UI, a plurality of control UIs are stored in a stack structure. Such method will be described. FIG. 5 is a view illustrating a method of maintaining information about a plurality of control UIs according to the present invention In FIG. 5, a method of maintaining existing control UI information when the start notification (START CUI Event Notification) 401 and the termination notification (END CUI Event Notification) 402 are generated will be described.

It is assumed that the content screen 1 is reproduced at the RUIC 100 and the third party device 102 controls the content screen 1, 301, by the control UI 1, 304. Here, when the content screen is changed from the screen 1, 301, to screen 2, 302 at a particular time point, the RUIC 100 generates the start notification (Start CUI Notification) 403 and records current information 501 about the currently used control UI 1, 304, in the memory device.

Likewise, when the content screen 2, 302 is changed to the content screen 3, 303, the RUIC 100 generates the start notification (Start CUI Notification) 404 and records current information 502 about the currently used control UI 2, 302, in the memory device.

On the other hand, when reproducing of the content screen 3, 303, is ended, the RUIC 100 generates the termination notification (End CUI Notification) 405, transmits information about the CUI 2, 305, recorded at top of the stack structure, and deletes corresponding information 503.

Finally, when reproducing of the content screen 2, 302, is ended, the RUIC 100 generates the termination notification (End CUI Notification) 406. In addition, the RUIC 100 transmits information 504 about the control UI 1 recorded at top of the stack structure to the user and deletes the corresponding information 504. Thus, the control UI may be recorded and deleted from the memory device by using the stack structure.

Figure 6:
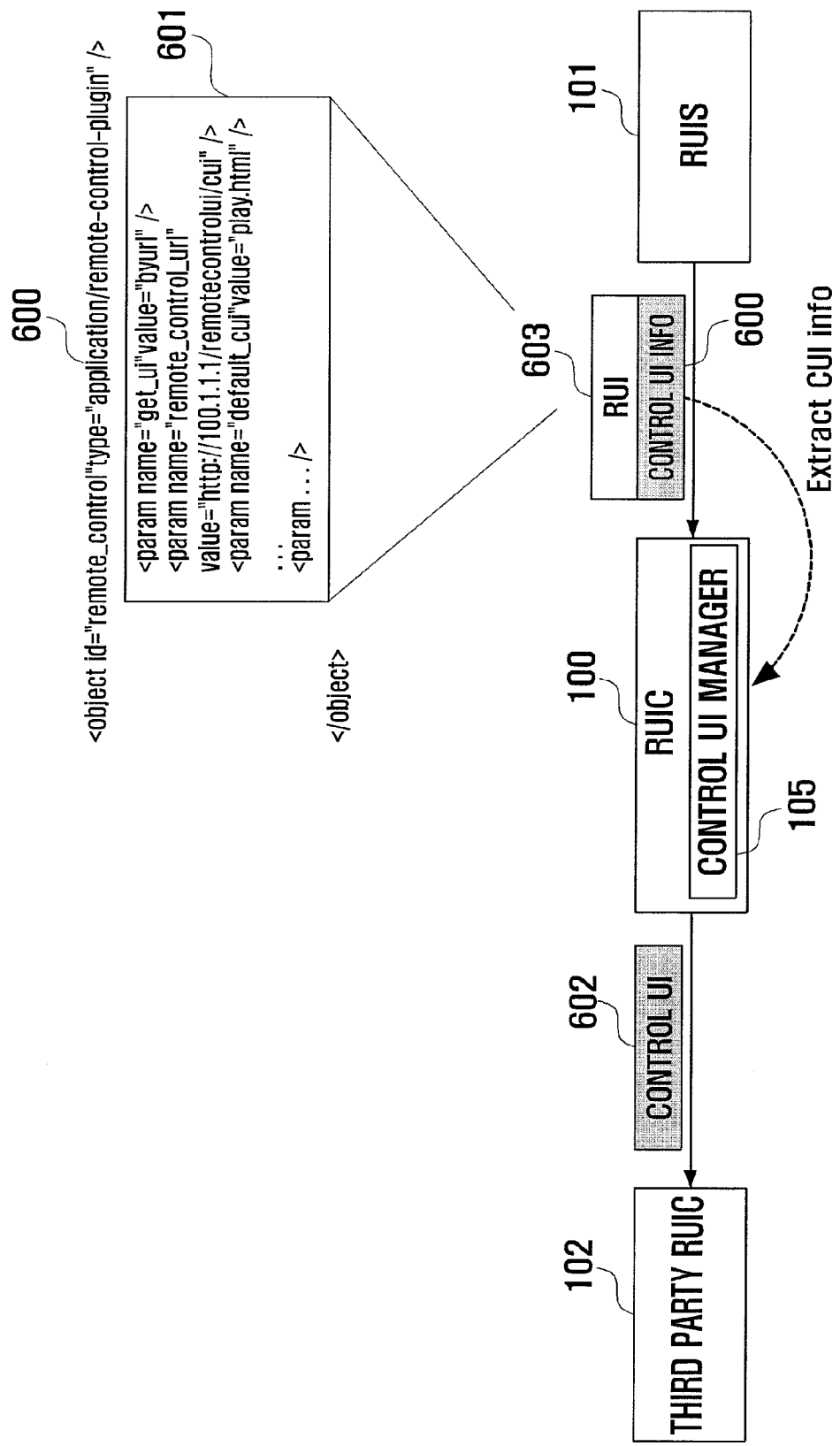
FIG. 6 is a view for explaining a method of fetching, by RUIC, a plurality of control UIs associated with a content from an RUIS according to an exemplary embodiment of the present invention.

FIG. 6 is a view for explaining a method of fetching, by RUIC, a plurality of control UIs associated with a content from an RUIS according to an exemplary embodiment of the present invention.

First, the RUIS 101 transmits information about a content RUI 603 together with information about a content RUI 604 that can fetch a plurality of control UIs associated with a corresponding content to the RUIC 100.

The RUIC 100 extracts control UI information 600 from the RUI 603 through the control UI manager unit 105. The extracted control UI information 600 includes various information, a part of which may be configured as Table 3 as shown below.

TABLE 3

```
<object id="remote_control" type="application/remote-control-
plugin" />
    <param name="get_ui" value=byurl />
    <param name="remote_control_url"
    value="http://100.1.1.1/remotecontrolui/cui" />
    <param name="default_cui" value="play.html" />
    . . .
    <param . . . />
</object>
```

Various methods exist for fetching the control UI from the RUIS 101. One of those is shown in an exemplary embodiment of FIG. 6 in which the control UIs can be obtained from the RUIS 101 through the control UI information 600 of Table 3 in a uniform resource location (URL) format. In other words, a method in which a location of the stored control UIs can be obtained from the control UI information 600 of Table 3 to download a corresponding control UI can be used.

The control UI information 600 includes URL information that can fetch a plurality of control UIs and information about default control UI that is firstly used to control a corresponding content RUI when the content RUI is rendered for the first time. Other than these, numerous information for handling a plurality of control UIs are included.

The control UI manager unit 105 extracts the control UI information 600 about the corresponding content and, based on the extracted information, the control UIs can be transmitted from the RUIS 101 to the RUIC 100 to be stored in the control UI manager unit 105 within the RUIC or control UIs that are already stored in the RUIC 100 can be reused.

At a particular time point, the RUIC 100 transmits a plurality of control UIs that can control the content RUI 603, a control UI 602, to the third RUIC device 102 by using the control UI manager unit 105.

On the other hand, in order to fetch a plurality of control UIs according to a content from the RUIS 101, the RUIC 100 must inform the RUIS 101 that the plurality of the control UIs can be operated, which is achieved through a capability negotiation process.

Table 4 is a table for explaining information for determining whether a plurality of control UIs are supported according to an exemplary embodiment of the present invention.

TABLE 4

```
. . .
<xs:complexType name="uiExtensionType">
    <xs:choice minOccurs="0" maxOccurs="unbounded">
        <xs:element name="width" type="unsignedInt"/>
        <xs:element name="height" type="unsignedInt"/>
        <xs:element name="colors" type="colorType"/>
        <xs:element name="hscroll" type="xs:boolean"/>
        <xs:element name="vscroll" type="xs:boolean"/>
        <xs:element name="font" type="fontFormatType"/>
        <xs:element name="navigationkeys" type="xs:boolean"/>
        <xs:element name="numerickeys" type="xs:boolean"/>
        <xs:element name="playcontrolkeys" type="xs:boolean"/>
        <xs:element name="colorkeys" type="xs:boolean"/>
        <xs:element name="alphakeys" type="xs:boolean"/>
        <xs:element name="key" type="xs:string"/>
        <xs:element name="pointer" type="xs:boolean"/>
        <xs:element name="security" type="xs:securityType"/>
        <xs:element name="download" type="downloadType"/>
        <xs:element name="overlay" type="overlayType"/>
        <xs:element name="overlaylocal" type="overlayType"/>
        <xs:element              name="notificationscripts"
        type="xs:boolean"/>
        <xs:element name="save-restore" type="xs:boolean"/>
```

TABLE 4-continued

```
        <xs:element              name="mime-extensions"
        type="mimeExensionType"/>
        <xs:element name="multipleCUIs" type="xs:boolean"/>
    </xs:choice>
</xs:complexType>
. . .
```

In Table 4, a remote UI client capability description schema of CEA-2014 is described as an example.

An element "MultipleCUIs" can be defined as a Boolean value having a value of "TRUE" or "FALSE."

Here, when the element "multipleCUIs" has a value of "TRUE," the RUIC 100 supports a plurality of control UIs, which indicates that the RUIC 100 is capable of receiving a plurality of control UIs to transmit a specific control UI to the third party device 102 at a particular time point.

On the other hand, when the element "multipleCUIs" has a value of "FALSE," it indicates that RUIC 100 is not capable of receiving and processing the plurality of the control UIs, as described above.

Table 5 is a table for explaining an object and APO for handling a plurality of control UIs according to an embodiment of the present invention,

TABLE 5

```
Object
    MultipleCUI
Plugin
    Type: application/multipleCUI
Attribute
    Current CUI
Method
    Start CUI Event Notification (String New CUI Info)
        Set Current CUI Info to the Storage
        Send New CUI Info to the Remote control
        Set New CUI to Current CUI Attribute
    End CUI Event Notification
        Get Previous CUI Info from the Storage
        Set Previous CUI to Current CUI Attribute
        Remove previous CUI Info in the Storage
```

Table 5 shows a definition of an object and APIs that can be rendered by the RUIC according to a CEA-2014 specification.

When implemented in local binding, an object for accessing and manipulating the control UI manager unit 105 can be named as "MultipleCUI." When implemented in local script binding, the object can be fabricated in a plug-in format. The plug-in format is named as "application/multipleCUI." And an attribute of accessing the control UI information for controlling a content currently being rendered is defined as "Current CUI." In addition, the start notification (Start CUI Event Notification) and the termination notification (End CUI Event Notification) are defined as a method capable of creating the CUI Event Notification at a particular time point and transmitting the control UI information to the third party device.

Figure 7:
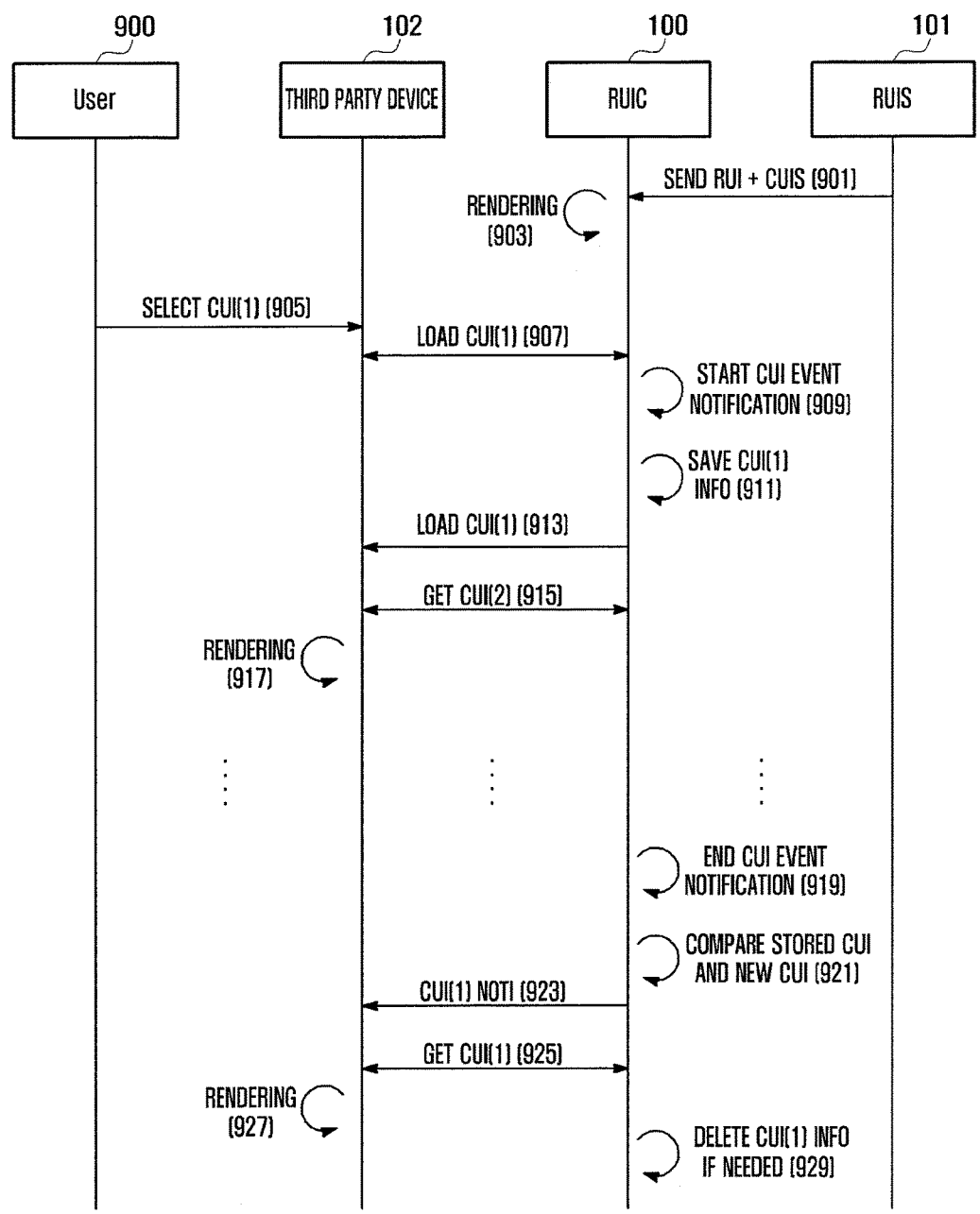
FIG. 7 is a view for explaining a remote control method using a plurality of control UIs according to an exemplary embodiment of the present invention.

FIG. 7 is a view for explaining a remote control method using a plurality of control UIs according to an exemplary embodiment of the present invention.

An exemplary embodiment of FIG. 7 can apply to a specification of the CEA-2014. Also, an RUIC2 100 is a device that receives a plurality of control UIs from the RUIS 101, and the RUIC1 102 is the third party device. For example, the RUIC2 100 can be a TV and the RUIC1 102 can be a mobile terminal.

The RUIS 101 sends a plurality of control UIs that can control the content RUI and a corresponding RUI to the RUIC2 100 (901). Then, the RUIC 100 displays the received content RUI on a screen (903).

Here, when the user 900 requests a control UI for controlling a screen of the current RUIC 100 to the third party device 102 (905), the third party device 102 receives the corresponding control UI from the RUIC 100. Here, the control UI is a control UI that can control the current RUIC 100 screen and is assumed to be the control UI 1 (CUI1). The third party device 102 receives the control UI 1 (i.e., load CUI1) through an exchange of request and response messages with the RUIC 100.

While the RUI is being reproduced, when the RUI is changed to a different screen at a particular time point, an event according to the start notification (Start CUI Event Notification) method is generated. Then, the RUIC 100 detects the start notification (Start CUI Event Notification) (909) and stores the control UI (CUI1), which is used by the third party device 102, in the memory device of the RUIC 100 (911). Next, the RUIC 100 transmits the control UI information (information about the CUI2) that can control the changed screen to the third party device 102 (913). Here, the control UI that can control the changed screen is assumed to be the control UI 2 (CUI2).

If the third party device 102 that receives the control UI information (information about the CUI2) can render the control UI based on only the corresponding information, the third party device 102 can render the control UI 2 (CUI2) on a screen thereof to be used by the user 900.

On the other hand, when rendering is not possible only with the control UI information (information about the CUI2), the third party device 102 requests the control UI (CUI2) to the RUIC 100 based on the information received (e.g., control UI URL) to receive the control UI (CUI2) that can actually control (915). Next, the third party device 102 renders the control UI 2 (CUI2) on its screen (917). Accordingly, the user may control the RUIC 100 and an RUI content that is being rendered on the third party device 102 and the RUIC 100 through the control UI 2 (CUI2).

Here, it is assumed that the RUI content screen being viewed by the user is changed.

Then, the RUIC 100 generates the termination notification (End CUI Event Notification) (919), and compares the control UI information that is stored most recently in the memory device with the control UI that can control an RUI content screen to be switched (921). Namely, the control UI information stored previously in the memory device (in step 911) is compared with the control UI for controlling the switched screen to determine whether the two are identical. According to the comparison result, if the two are identical, the RUIC 100 transmits the control UI information (information about the CUI1) stored in the memory device to the third party device 102 (923).

The third party device 102 that receives the control UI information (information about CUI1) can render the control UI 1 (CUI1) with the corresponding information only. Here, when rendering is impossible only with the control UI information (CUI1 information), the third party device 102 requests the control UI (CUI1) to the RUIC 100 based on the information received in step 923 (e.g., URL of the control UI 1) and receives the control UI (CUI2) that can actually control. Then, the third device 102 renders the control UI (CUI1) on its screen (927).

Also, after transmitting the control UI information or control UI itself, the RUIC 100 deletes the corresponding control UI information from the memory device (929).

On the other hand, according the comparison result of step 921, if the control UI information stored in the memory device is different from the control UI that can control the changed screen, the control UI information that can control the RUI content screen to be changed is transmitted.

Figure 8:
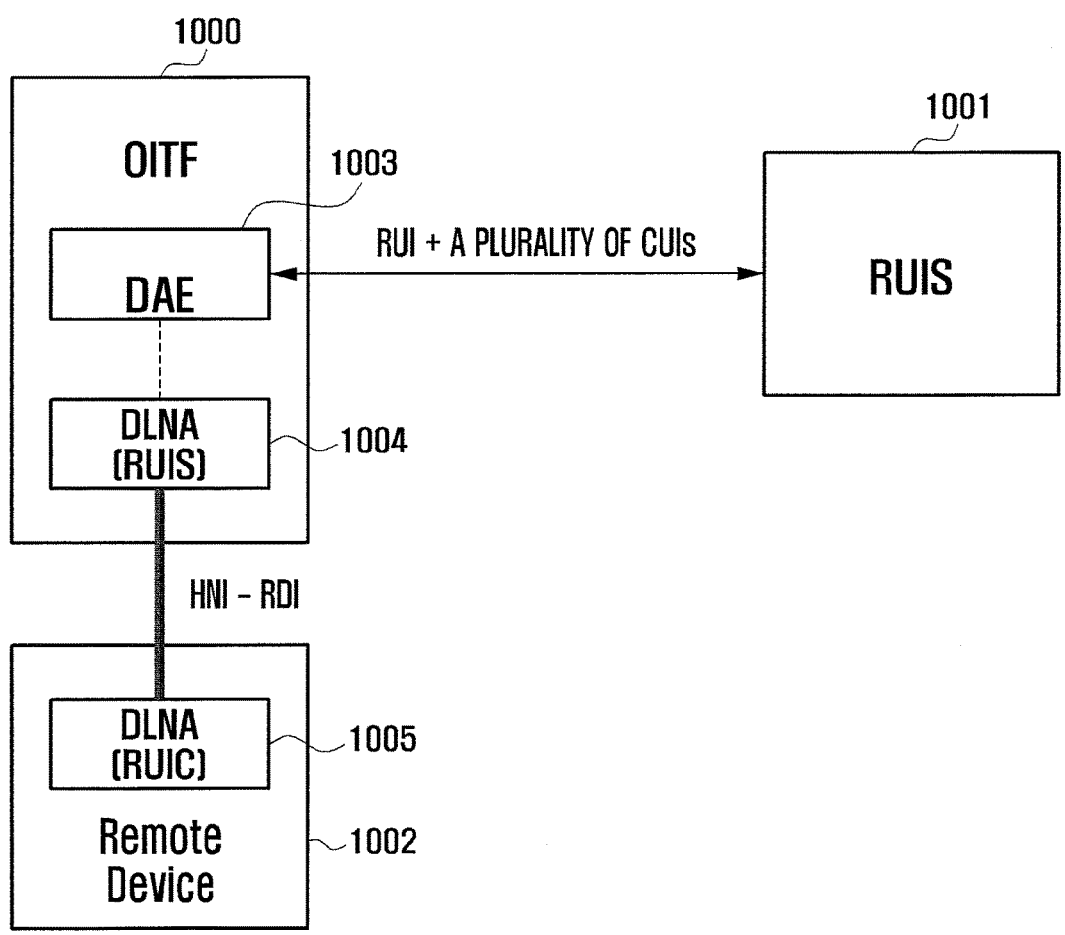
FIG. 8 is a view for explaining a remote control system that supports a plurality of control UIs according to another exemplary embodiment of the present invention.

Next, a remote control system that supports a plurality of control UIs according to another embodiment of the present invention will be described. FIG. 8 is a view for explaining a remote control system that supports a plurality of control UIs according to another exemplary embodiment of the present invention.

An exemplary embodiment illustrated in FIG. 8 assumes a case in which a digital living network alliance (DLNA Function) 1004 within an open IPTV terminal function (OITF) terminal 1000 is used. It can be applied to an Open IPTV Architecture specification.

The remote control system according to another embodiment of the present invention includes an RUIC 1001, an OITF terminal 1000, and the third party device (Remote Device) 1002. Here, the OITF terminal 1000 corresponds to the RUIC 100. Namely, the OITF terminal 1000, when compared with FIG. 1, can be the RUIC 100.

The OITF terminal 1000 and the third party device 1002 each includes a DLNA server 1004 and a DLNA client 1005 for performing a function according to the DLNA, and such DLNA server 1004 and DLNA client 1005 have all DLNA features. Here, the DLNA server 1004 performs a server (RUIS) function in a sense that the DLNA server 1004 provides the control UI to the third party device 1002, and correspondingly, the DLNA client 1005 performs a client (RUIC) function.

The OITF terminal 1000 corresponds to the RUIC 100 and the OITF terminal 1000 includes a declarative application environment (DAE) 1003, and a DLNA server 1004.

As described above, the DLNA server 1004 includes all DLNA features. In particular, the DLNA server 1004 includes a remote UI function of the DLNA (DLNA RUI function). The remote UI (DLNA RUI) of the DLNA may use a remote UI function between devices having the DLNA features based on CEA-2014.

The DAE 1003 receives the plurality of the control UI (CUI) and the remote UI (RUI) rendered on the DAE1003 from the RUIC 1001. Then, the DAE 1003 transmits the plurality of the control UIs (CUI) to the DLNA server 1004.

The DLNA client 1005 of the third party device (Remote Device) 1002 may discover the DLNA server 1004 within the OITF terminal 1000.

The DLNA client 1005 receives, from the DLNA server 1004, the control UI (CUI) that can control the corresponding remote UI (RUI) through the start notification (START CUI Event Notification) and the termination notification (END CUI Event Notification), as described above with reference to FIGS. 4 to 6 and Table 4, at a particular time point of the remote UI (RUI) that is being rendered by the DAE1003.

The DLNA client 1005 of the third party device 1002 renders the received control UI (CUI) to be used by the user. Here, through the rendered control UI (CUI), the user may transmit the control information to the DLNA server 1004.

When the DLNA server 1004 receives the control information, the DLNA server 1004 performs a control action according to the control information and target information. After receiving the corresponding control information, the DLNA server 1004 that receives the control information controls the OITF terminal 1000 when an object to be controlled is the OITF terminal 1000 and controls an object by transmitting the corresponding control information to the DAE 1003 when the object is the remote UI (RUI) that is being rendered within the DAE 1003. The interface between the DAE 1003 and the DLNA server 1004 can be formed through "local script binding" or "local binding" or other method.

FIG. 9 is a view for explaining a remote control method using a plurality of control UIs according to another exemplary embodiment of the present invention.

Referring to FIG. 9, the OITF terminal 1000 has the DLNA server 1004 and the DLNA server 1004 has an IRCF-Server. The IRCF-Server is provided to communicate with an IPTV Remote Control Function (IRCF) within the DLNA client 1005 of the third party device (Remote Device) 102. Particularly, as shown in reference numeral 1100, the IRCF Server has a default control UI.

Here, the default control UI is assumed to be a control UI that displays broadcast programming information and enables selection of a broadcasting service in accordance with the programming information. For example, such default control UI can be ECG.

The third party device activates an IRCF function according to a user input (1101). When the IRCF function is activated, the third party device 1002 can discover the DLNA server 1004 of the OITF terminal 1000 (1103). A discovery method is preferably based on a DLNA discovery (UPnP Discovery) method, and the OITF terminal 1000 having the DLNA server 1004 discovered by such method can be multiple.

When the user selects the OITF terminal 1000 the user wants to control among the DLNA server 1004 discovered by the user, the third party device 1002 requests the default control information to the OITF terminal 1000 (1105). The DLNA server 1004 of the OITF terminal 1000 that receives a request transmits the default control UI to the DLNA client 1005 of the third party device 1002 (1107). The third party device 1002 renders the received default control UI on the screen (1109). According to a rendering result, the broadcast programming information is displayed according to ECG.

The user can select a desired IPTV service through the default control UI that is rendered (1111). Then the third party device 1002 transmits an HTTP message requesting the IPTV service selected by the user to the DLNA server 1004 of the OITF terminal 1000 (1113).

The DLNA server 1004 of the OITF terminal 1000 processes the received HTTP message requesting the IPTV service or transmits the HTTP message as it is to the DAE 1003 (1115).

On the other hand, the RUIS 1001 includes an IPTV Application and the DAE 1003 requests a DAE application (RUI) related to the IPTV service and the plurality of the control UIs (CUI) related to a corresponding IPTV service to the RUIC 1001 (1117) and receives them (1119). The DAE 1003 renders the received DAE application (RUI) on a screen.

The DAE 1003 transmits the plurality of the control UIs (CUI) to the DLNA server 1004 (1121). Then, the DLNA server 1004 stores the plurality of the control UIs (CUI). Also, the DLNA server 1004 transmits, among the plurality of the control UIs (CUI), a control UI (CUI) appropriate for a corresponding screen that is being rendered (1123).

These steps 1121 to 1123 can be performed as follows.

The DAE 1003 has a remote control plug-in and a "boolean sendMessage (String message)" method.

The DAE 1003 may transmit a control UI appropriate for the corresponding screen to the DLNA client 1005 through the method via the DLNA server 1004. A parameter (string message) "SendMessage" includes, for example, an XML, JSON, or Plain Text and may transmit a message in a form of XML, JSON, or Plain Text.

Table 6 shows an example of a parameter value in case where the parameter of a method defined in FIG. 9 is in an XML format.

TABLE 6

```
<message>
    <event type>start</event type>
    <cui url>cui/aaa.html</cui url>
</message>
```

Referring to FIG. 9, the parameter "sendMessage" is defined in the XML format and its content may be the start notification (START CUI Event Notification) or the termination notification (End CUI Event Notification).

The remote control plug-in of the DAE 1004 receives the parameter "sendMessage" in the XML format as shown in Table 6. Then, the remote control plug-in interprets the parameter and performs an action in accordance with a process related to the start notification (START CUI Event Notification) or the termination notification (End CUI Event Notification), as described above, so that the DLNA server transmits a corresponding control UI to the third party device 1002.

On the other hand, in steps 1121 to step 1123 as described above, each entity 1003, 1004 of the OITF terminal 1000 stores a plurality of control UIs and detects generation of a notification event to share with one another in processing a function to transmit the control UI according to a type of the notification event; however, a function performed by each entity 1003, 1004 may be different from each other, or one of the entities (one of 1003 and 1004) may perform all the functions.

The third party device 1002 renders the received control UI (CUI) on a screen (1125). Then, the user may perform a control action through the corresponding control UI (CUI) (1127). In other words, the user may enter a desired input through a screen of the third party device on which the corresponding control UI is rendered.

The third party device 1002 transmits a control action requested by the user to the DLNA server 1004 as an HTTP message (1129). Then, the DLNA server 1004 transmits a corresponding control action to the DAE 1003 to perform a corresponding action (1131).

Then, the DLNA server 1004 returns an HTTP message (200 OK) notifying that the corresponding control action is performed to the third party device 102 (1133).

Steps 1123 to 1133 described above may be repeatedly performed whenever a content screen reproduced by the OITF terminal 1000 is changed. In other words, when the content screen is changed, the DLNA server 1004 provides the control UI for controlling the corresponding content screen to the third party device 1002, the third party device 1002 renders the received control UI, and the user may perform a control action through the control UI being rendered.

INDUSTRIAL APPLICATION

In the above, although the embodiments of the present invention have been described with reference to the accompanying drawings, a person skilled in the art should apprehend that the present invention can be embodied in other specific forms without departing from the technical spirit or essential characteristics thereof. Thus, the embodiments described above should be construed as exemplary in every aspect and not limiting.

The invention claimed is:

1. A remote control method using a control user interface of a remote user interface (UI) client, the remote control method comprising:
   receiving, by the remote UI client, a message requesting a service to be displayed to the remote UI client from a remote device;
   transmitting a message requesting the service, including a first screen and a second screen, and a control UI related to the first screen and the second screen to a remote UI server when the remote UI client receives the message requesting the service from the remote device;
   receiving, by the remote UI client, content information on the first screen and the second screen, control UI information including a first control UI corresponding to the first screen and a second control UI corresponding to a second control UI, and time information on transmission of the control UI based on the message requesting the control UI from the remote UI server, the time information including start notification information and termination notification information of the second control UI;
   transmitting, by the remote UI client, the received first control UI to the remote device when the remote UI client displays the first screen of a first playing multimedia content; and
   transmitting, by the remote UI client using the start notification information, the received second control UI different from the first control UI to the remote device, when the first screen of the first playing multimedia content on the remote UI client is changed to the second screen of a second playing multimedia content on the remote UI client based on the message requesting the service,
   wherein the first control UI is displayed at the remote device while the first screen is displayed at the remote UI client based on the content information,
   wherein the second control UI is displayed at the remote device while the second screen is displayed at the remote UI client based on the content information, and
   wherein, when the second screen on the remote UI client is changed to the first screen, the termination notification information is transmitted from the remote UI client to the remote device for displaying the first control UI on the remote device.

2. The remote control method according to claim 1, further comprising, subsequent to the transmitting, by the remote UI client, the received first control UI and the received second control UI to the remote device, transmitting, when the remote UI client receives a control action from the remote device, a response to the remote device by processing the received control action.

3. The remote control method according to claim 1, further comprising, prior to the receiving, by the remote UI client, the message requesting the service from the remote device,
   transmitting a default control UI to the remote device when the remote UI client receives a request for the default control UI from the remote device.

4. A remote control method using a control user interface of a remote device, the remote control method comprising:
   transmitting, when the remote device receives a selection input, a message requesting a service to be displayed to a remote user interface (UI) client to the remote UI client, the service including a first screen and a second screen;
   receiving, by the remote device, a first control UI corresponding to the first screen in response to the message requesting the control UI from the remote UI client which receives content information on the first screen and the second screen, control UI information including the first control UI and a second control UI and time information on transmission of the control UI from a remote UI server, when the remote UI client displays the first screen of a first playing multimedia content, the time information including start notification information and termination notification information of the second control UI;
   rendering, by the remote device, the received first control UI;
   receiving, by the remote device, the second control UI different from the first control UI, when the first screen of the first playing multimedia content on the remote UI client is changed to the second screen of a second playing multimedia content on the remote UI client based on the message requesting the service, wherein the second control UI corresponds to the second screen of the second playing multimedia content and wherein the second control UI is transmitted from the remote UI client based on the start notification information used by the remote UI client to transmit the second control UI;
   rendering, by the remote device, the received second control UI; and
   rendering, by the remote device, the received first control UI, when the termination notification information is transmitted from the remote UI client in response to changing the second screen to the first screen on the remote UI client,
   wherein the first control UI is displayed at the remote device while the first screen is displayed at the remote UI client based on the content information, and
   wherein the second control UI is displayed at the remote device while the second screen is displayed at the remote UI client based on the content information.

5. The remote control method according to claim 4, further comprising, transmitting, when the remote device receives a control action input through the control UI, a control action corresponding to the control action input to the remote UI client.

6. The remote control method according to claim 4, further comprising, prior to the transmitting, when the remote device receives the selection input, the message requesting the service to the remote user interface (UI) client,
   searching the remote UI client when the remote device receives a remote control function activation input;
   transmitting, by the remote device, a request for a default control UI to the searched remote UI client;
   receiving, by the remote device, the default control UI from the searched remote UI client; and
   rendering, by the remote device, the received default control UI.

7. A remote control system using a control user interface, the remote control system comprising:
   a remote device configured to:
      transmit a message requesting a service to be displayed to a remote user interface (UI) client to the remote UI client when a selection input is received, and receive and render a control UI corresponding to the message requesting the service, wherein the remote UI client is configured to:
transmit a message requesting the service, including a first screen and a second screen, and a control UI related to the first screen and the second screen to a remote UI server upon receiving the message requesting the service from the remote device,
receive content information on the first screen and the second screen, control UI information including a first control UI corresponding to the first screen and a second control UI corresponding to a second control UI and time information on transmission of the control UI based on the message requesting the control UI from the remote UI server, the time information including start notification information and termination notification information of the second control UI,
transmit the received first control UI based on the time information to the remote device when the remote UI client displays the first screen of a playing multimedia content currently,
transmit the received second control UI different from the first control UI to the remote device based on the start notification information, when the first screen of the currently playing multimedia content on the remote UI client is changed to the second screen of a second playing multimedia content on the remote UI client based on the message requesting the service, and
transmit the termination notification information to the remote device in response to changing the second screen to the first screen on the remote UI client,
wherein the first control UI is displayed at the remote device while the first screen is displayed at the remote UI client based on the content information,
wherein the second control UI is displayed at the remote device while the second screen is displayed at the remote UI client based on the content information, and
wherein the first control UI is displayed on the remote device based on transmitting the termination notification information from the remote UI client to the remote device.

8. The remote control system according to claim 7, wherein, when the remote device receives a control action input through the control UI, the remote device transmits a control action corresponding to the received control action input to the remote UI client, and
when the remote UI client receives the control action, the remote UI client transmits a response to the remote device by processing the received control action.

9. The remote control system according to claim 7, wherein, when the remote device receives a remote control function activation input, the remote device searches the remote UI client, transmits a request for a default control UI to the searched remote UI client, and, upon receiving the default control UI from the searched remote UI client, rendering the received default control UI.

10. The remote control system according to claim 9, wherein, when the remote UI client receives the request for the default control UI from the remote device, the remote UI client transmits the default control UI to the remote device.

11. An apparatus using a control user interface of a remote User Interface (UI) client, the apparatus comprising:
a transceiver configured to communicate data with other network nodes; and
at least one processor configured to control:

receiving a message requesting a service to be displayed to the remote UI client from a remote device,
transmitting a message requesting the service, including a first screen and a second screen, and a control UI related to the first screen and the second screen to a remote UI server when the remote UI client receives the message requesting the service from the remote device;
receiving content information on the first screen and the second screen, control UI information including a first control UI corresponding to the first screen and a second control UI corresponding to a second control UI, and time information on transmission of the control UI based on the message requesting the control UI from the remote UI server, the time information including start notification information and termination notification information of the second control UI;
transmitting the received first control UI based on the time information to the remote device when the remote UI client displays the first screen of a playing multimedia content currently; and
transmitting, to the remote device, the received second control UI different from the first control UI using the start notification information, when the first screen of the currently playing multimedia content on the remote UI client is changed to the second screen of a second playing multimedia content on the remote UI client based on the message requesting the service,
wherein the first control UI is displayed at the remote device while the first screen is displayed at the remote UI client based on the content information,
wherein the second control UI is displayed at the remote device while the second screen is displayed at the remote UI client based on the content information, and
wherein, when the second screen on the remote UI client is changed to the first screen, the termination notification information is transmitted from the remote UI client to the remote device for displaying the first control UI on the remote device.

12. The apparatus of claim 11, wherein the at least one processor is further configured to control transmitting, when the remote UI client receives a control action from the remote device, a response to the remote device by processing the received control action.

13. The apparatus of claim 11, wherein the at least one processor is further configured to control, prior to the receiving the message requesting the service from the remote device, transmitting a default control UI to the remote device when the remote UI client receives a request for the default control UI from the remote device.

14. An apparatus using a control User Interface (UI) of a remote device, the apparatus comprising:
a transceiver configured to communicate data with other network nodes; and
at least one processor configured to control:
transmitting, when the remote device receives a selection input, a message requesting a service to a remote UI client, the service including a first screen and a second screen,
receiving a first control UI corresponding to the first screen in response to the message requesting the control UI from the remote UI client which receives content information on the first screen and the second screen and control UI information including the first control UI, a second control UI and time information on transmission of the control UI from a remote UI server, when the remote UI client displays the first screen of a first playing multimedia content, the time information including start notification information and termination notification information of the second control UI, rendering the received first control UI, receiving the second control UI different from the first control UI, when the first screen of the first playing multimedia content on the remote UI client is changed to the second screen of a second playing multimedia content on the remote UI client based on the message requesting the service, wherein the second control UI corresponds to the second screen of the second playing multimedia content, and wherein the second control UI is transmitted from the remote UI client based on the start notification information used by the remote UI client to transmit the second control UI, rendering the received second control UI, rendering, by the remote device, the received first control UI, when the termination notification information is transmitted from the remote UI client in response to changing the second screen to the first screen on the remote UI client, wherein the first control UI is displayed at the remote device while the first screen is displayed at the remote UI client based on the content information, and wherein the second control UI is displayed at the remote device while the second screen is displayed at the remote UI client based on the content information.

15. The apparatus of claim 14, wherein the at least one processor is further configured to control transmitting, when the remote device receives a control action input through the control UI, a control action corresponding to the control action input to the remote UI client.

16. The apparatus of claim 14, wherein the at least one processor is further configured to control, prior to the transmitting of the message requesting the service to the remote UI client, searching the remote UI client when the remote device receives a remote control function activation input, transmitting a request for a default control UI to the searched remote UI client, receiving the default control UI from the searched remote UI client and rendering the received default control UI.

* * * * *